US011649906B2

(12) United States Patent
Park

(10) Patent No.: US 11,649,906 B2
(45) Date of Patent: May 16, 2023

(54) SOLENOID VALVE

(71) Applicants: HYUNDAI MOTOR COMPANY, Seoul (KR); KIA CORPORATION, Seoul (KR)

(72) Inventor: In Tae Park, Yongin-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 79 days.

(21) Appl. No.: 17/318,715

(22) Filed: May 12, 2021

(65) Prior Publication Data
US 2022/0146011 A1  May 12, 2022

(30) Foreign Application Priority Data

Nov. 10, 2020  (KR) .................. 10-2020-0149459

(51) Int. Cl.
*F16K 31/06* (2006.01)
*F16K 31/40* (2006.01)

(52) U.S. Cl.
CPC ...... *F16K 31/0655* (2013.01); *F16K 31/0651* (2013.01); *F16K 31/0675* (2013.01);
(Continued)

(58) Field of Classification Search
CPC .. F16K 31/0606; F16K 31/0651; F16K 31/40; F16K 31/406; F16K 31/408; Y10T 137/88062
(Continued)

(56) References Cited

U.S. PATENT DOCUMENTS 3,183,932 A * 5/1965 Karpus, Jr. .......... G05D 7/0635
137/503
4,103,686 A * 8/1978 LeFevre ................ A61M 5/172
604/249
(Continued)

FOREIGN PATENT DOCUMENTS

JP          H08200540 A     8/1996
KR       101628569 B1      6/2016

*Primary Examiner* — Matthew W Jellett
(74) *Attorney, Agent, or Firm* — Lempia Summerfield Katz LLC

(57) ABSTRACT

A solenoid valve includes: a valve housing having, at one end thereof, an inlet port through which a fluid is introduced and having, at the other end thereof, an outlet port through which the fluid is discharged; a solenoid provided in the valve housing and disposed between the inlet port and the outlet port; a first plunger provided at one end of the solenoid adjacent to the inlet port and configured to selectively open or close the inlet port by being rectilinearly moved by the solenoid; a first spring member configured to provide elastic force to allow the first plunger to move in a direction in which the first plunger closes the inlet port; a second plunger provided at the other end of the solenoid adjacent to the outlet port and configured to selectively open or close the outlet port by being rectilinearly moved by the solenoid in a direction opposite to the movement direction of the first plunger; and a second spring member configured to provide elastic force to allow the second plunger to move in a direction in which the second plunger closes the outlet port. The solenoid valve has a simplified structure while ensuring sealability.

16 Claims, 11 Drawing Sheets

(52) U.S. Cl.
CPC ........ *F16K 31/0696* (2013.01); *F16K 31/406* (2013.01); *F16K 31/408* (2013.01); *Y10T 137/88062* (2015.04)

(58) Field of Classification Search
USPC .............................. 251/30.04, 30.05, 129.21
See application file for complete search history.

(56) References Cited

U.S. PATENT DOCUMENTS

| | | | | |
|---|---|---|---|---|
| 4,629,099 A * | 12/1986 | Jones | ................... | A61M 5/142 137/844 |
| 5,085,563 A * | 2/1992 | Collins | ................. | H02K 33/12 417/417 |
| 5,188,017 A * | 2/1993 | Grant | ..................... | F17C 13/04 251/129.21 |
| 5,199,459 A * | 4/1993 | Mullally | ............. | F16K 31/0651 251/129.21 |
| 5,450,876 A * | 9/1995 | Reinicke | ............. | F16K 31/0675 137/614.19 |
| 6,010,312 A | 1/2000 | Suitou et al. | | |
| 6,548,837 B1 * | 4/2003 | Vaz De Azevedo | ........................ | F16K 31/0696 251/129.21 |
| 6,880,564 B2 * | 4/2005 | Erickson | ........... | A61M 5/16881 251/129.1 |
| 8,322,376 B2 * | 12/2012 | Ho | ...................... | F16K 31/0606 137/625.68 |
| 8,539,979 B2 * | 9/2013 | Frank | .................... | B60T 15/027 335/265 |
| 8,794,718 B2 * | 8/2014 | Bensch | ............... | F16K 31/0606 137/596.1 |
| 9,273,791 B2 * | 3/2016 | Vandamme | ......... | F16K 31/0655 |
| 10,655,747 B2 * | 5/2020 | Vopel | ................. | F16K 31/0658 |
| 11,204,105 B2 * | 12/2021 | Park | .......................... | F01P 7/14 |
| 11,255,455 B2 * | 2/2022 | Goers | ................... | H01F 7/1615 |
| 2016/0169404 A1 | 6/2016 | Choi et al. | | |
| 2021/0331801 A1 * | 10/2021 | John | ................... | F16K 31/0624 |

* cited by examiner

SOLENOID VALVE

CROSS-REFERENCE TO RELATED APPLICATION

This application claims priority to and the benefit of Korean Patent Application No. 10-2020-0149459 filed in the Korean Intellectual Property Office on Nov. 10, 2020, the entire contents of which are incorporated herein by reference.

TECHNICAL FIELD

The present disclosure relates to a solenoid valve, and more particularly, to a solenoid valve having ensured sealability and a simplified structure.

BACKGROUND ART

A solenoid valve may be used to regulate a flow of a fluid or control a pressure (flow rate) and the like.

For example, the solenoid valve may be installed in a power train including an engine of a vehicle and serve to regulate a flow of a fluid such as fuel or oil or control a pressure. More specifically, a solenoid valve mounted in a fuel system may control an operation of supplying and injecting fuel. A solenoid valve mounted in a cooling system may control circulation for lubrication and cooling. A solenoid valve mounted in a power transmission system may serve to control a pressure and a flow rate.

Meanwhile, if sealing performance of the solenoid valve is not ensured, there may be problems in that it is difficult to accurately regulate (turn on/off) the flow of the fluid, accuracy in controlling the flow rate deteriorates, and a safety accident may occur. Therefore, sealability of the solenoid valve needs to be ensured.

For example, if hydrogen leaks from the solenoid valve mounted in a hydrogen supply line that requires high sealability, safety problems may occur, such as damage to components, explosion, fires, and the like. Therefore, the sealability of the solenoid valve needs to be ensured.

However, in the related art, a shut-off solenoid valve for regulating a flow of a fluid and a flow rate control solenoid valve for controlling a flow rate of the fluid need to be separately and independently provided in order to ensure stability and sealability of the solenoid valve. Thus, there are problems in that the structure becomes complicated, spatial utilization and a degree of design freedom deteriorate, and cost and weight are increased.

To this end, recently, research has been conducted to ensure sealability of the solenoid valve and to simplify the structure of the solenoid valve, but the research result is still insufficient. Accordingly, there is a need for development of a solenoid valve having ensured sealability and a simplified structure.

SUMMARY

The present disclosure has been made in an effort to provide a solenoid valve having ensured sealability and a simplified structure.

The present disclosure has also been made in an effort to implement a double shut-off structure by using a single solenoid.

The present disclosure has also been made in an effort to improve spatial utilization and a degree of design freedom and to reduce cost and weight.

The present disclosure has also been made in an effort to improve stability and reliability.

The present disclosure has also been made in an effort to improve accuracy of proportional control.

The objects to be achieved by the present disclosure are not limited to the above-mentioned objects, but also include objects or effects that may be recognized from the solutions or the embodiments described below.

In one aspect, the present disclosure provides a solenoid valve including: a valve housing having, at one end thereof, an inlet port through which a fluid is introduced and having, at the other end thereof, an outlet port through which the fluid is discharged; a solenoid provided in the valve housing and disposed between the inlet port and the outlet port; a first plunger provided at one end of the solenoid adjacent to the inlet port and configured to selectively open or close the inlet port by being rectilinearly moved by the solenoid; a first spring member configured to provide elastic force to allow the first plunger to move in a direction in which the first plunger closes the inlet port; a second plunger provided at the other end of the solenoid adjacent to the outlet port and configured to selectively open or close the outlet port by being rectilinearly moved by the solenoid in a direction opposite to the movement direction of the first plunger; and a second spring member configured to provide elastic force to allow the second plunger to move in a direction in which the second plunger closes the outlet port.

The above solenoid valve is configured to ensure sealability of the solenoid valve and simplify the structure.

In other words, it is possible to control a flow rate while regulating (turning on/off) a flow of a fluid by using the solenoid valve (the flow rate control valve). However, in the related art, there is a problem in that it is difficult to maintain high sealability by using the solenoid valve that performs both the two functions. One of the functions is regulating the flow of the fluid and the other function is controlling the flow rate, particularly, when overpressure occurs.

Further, in the related art, when the flow is stuck due to a component defect of the solenoid valve (the flow rate control valve) or external foreign substances or when the fluid leaks from a sealing surface, there is a risk of directly causing a safety accident.

Therefore, in a system or facility (e.g., a hydrogen supply line) that requires high stability and sealability, a shut-off solenoid valve for regulating the flow of the fluid and a flow rate control solenoid valve for controlling the flow rate of the fluid are separately and independently mounted. As described above, in the related art, the shut-off solenoid valve for regulating the flow of the fluid and the flow rate control solenoid valve for controlling the flow rate of the fluid need to be separately and independently provided in the system or facility that requires high stability and sealability. Thus, there are problems in that the structure becomes complicated, spatial utilization and a degree of design freedom deteriorate, and costs are increased.

However, according to an embodiment of the present disclosure, a double shut-off sealing structure is formed by using the first plunger and the second plunger that operate independently. As a result, it is possible to obtain an advantageous effect of ensuring high sealability and improving stability and reliability.

Above all, according to an embodiment of the present disclosure, the double shut-off structure is formed as the first plunger and the second plunger are independently operated by using the single solenoid. As a result, it is possible to obtain an advantageous effect of ensuring high sealability, simplifying the structure, and improving spatial utilization and a degree of design freedom.

Furthermore, it is possible to reduce the number of components to be controlled, thereby obtaining an effect of reducing costs for a controller and wiring.

In addition, according to an embodiment of the present disclosure, the first plunger and the second plunger may be independently operated. As a result, it is possible to obtain an advantageous effect of maintaining sealability even though any one of the first plunger and the second plunger is abnormal (broken down).

The timing of moving the first plunger and the second plunger by the solenoid may be variously changed in accordance with required conditions and design specifications.

According to the embodiment of the present disclosure, the second plunger and the first plunger sequentially open or close the outlet port and the inlet port based on a duty rate of the solenoid.

In particular, when the duty rate of the solenoid is within a first range, the second plunger may close the outlet port, and the first plunger may close the inlet port. When the duty rate of the solenoid is within a second range larger than the first range, the second plunger may open the outlet port, and the first plunger may close the inlet port. When the duty rate of the solenoid is within a third range larger than the second range, the first plunger may open the inlet port in a state in which the second plunger opens the outlet port.

According to an embodiment of the present disclosure, the fluid, which is introduced into the valve housing through the inlet port, may apply pressing force to the first plunger so that the first plunger moves in a direction in which the first plunger opens the inlet port.

This movement is to minimize deterioration in operating performance of the first plunger caused by inflow pressure of the fluid introduced into the valve housing through the inlet port.

In other words, if the inflow pressure of the fluid introduced into the valve housing is applied to a lower portion of the first plunger in the upward/downward direction (i.e., if the pressing force for moving the first plunger upward is applied to the lower portion of the first plunger), there is a problem in that the first plunger is difficult to normally move (move downward to open the inlet port) at a preset duty rate of the solenoid. There is also a problem in that the duty rate of the solenoid for operating the first plunger increases inevitably.

However, according to an embodiment of the present disclosure, since the inflow pressure of the fluid introduced into the valve housing is applied to an upper portion of the first plunger in the upward/downward direction, it is possible to obtain an advantageous effect of preventing an increase in duty rate of the solenoid for operating the first plunger (opening the inlet port) and an advantageous effect of sufficiently ensuring a duty-controllable section in which the movement (stroke) of the first plunger may be duty-controlled (improving control performance).

In particular, a fluid inflow direction in which the fluid is introduced through the inlet port may be identical to a fluid outflow direction in which the fluid is discharged to the outside of the valve housing through the outlet port.

The solenoid may have various structures capable of providing driving power for operating the first plunger and the second plunger.

According to an embodiment of the present disclosure, the solenoid may include a bobbin, around which a coil is wound, and a yoke provided in the bobbin. The yoke may be provided at one end of the bobbin so that the first plunger is partially received in the yoke so as to be rectilinearly movable. The second plunger may be partially received in the bobbin at the other end of the bobbin so as to be rectilinearly movable.

According to an embodiment of the present disclosure, the solenoid valve may include a guide member provided in the bobbin at the other end of the bobbin and configured to guide the rectilinear movement of the second plunger.

Since the guide member is provided in the bobbin as described above, it is possible to obtain an advantageous effect of minimizing the leftward and rightward movements and the deviation of the second plunger when the second plunger rectilinearly moves, thereby improving driving stability of the second plunger.

According to an embodiment of the present disclosure, a first guide flow path may be provided between the inlet port and the second plunger and configured to guide the fluid introduced into the inlet port to the second plunger. A second guide flow path may be provided between the first plunger and the outlet port and configured to guide the fluid passing through the first guide flow path to the outlet port. For example, the first guide flow path may be formed on the first plunger, and the second guide flow path may be formed on the second plunger.

According to an embodiment of the present disclosure, the solenoid valve may include a core provided in the solenoid and disposed between the first plunger and the second plunger. The core may have a through flow path configured to guide the fluid passing through the first guide flow path to the second guide flow path.

In other words, since the core is provided between the first plunger and the second plunger, an additional magnetic field for moving the first and second plungers toward the central portion of the bobbin may be formed by the core when the power is applied to the coil. As a result, it is possible to obtain an advantageous effect of ensuring smoother operations of the first and second plungers and increasing the magnetic field for moving the first and second plungers without increasing a size of the solenoid.

According to an embodiment of the present disclosure, the solenoid valve may include a first buffer member provided at an end of the first plunger facing the core and a second buffer member provided at an end of the second plunger facing the core.

Since the first buffer member is provided between the first plunger and the core and the second buffer member is provided between the second plunger and the core as described above, it is possible to mitigate impact which occurs when the first and second plungers come into contact with the core. As a result, it is possible to obtain an advantageous effect of improving stability and reliability and reducing operational noise.

According to the embodiment of the present disclosure, in the state in which the second plunger opens the outlet port, the second plunger may be disposed to be in close contact with the lower portion of the core, and the first plunger may open the inlet port by being rectilinearly moved by the magnetic field applied by the core and the second plunger.

As described above, in an embodiment of the present disclosure, since the magnetic fields (the magnetic fields for moving the first plunger) are generated by the core and the second plunger in the state in which the second plunger is in close contact with the lower portion of the core and the outlet port is opened, the first plunger may be moved by using both the magnetic field generated by the core and the magnetic field generated by the second plunger. As a result, it is possible to obtain an advantageous effect of improving efficiency in moving (operating) the first plunger.

Among other things, according to an embodiment of the present disclosure, the high magnetic fields for smoothly moving the first plunger may be formed without increasing inductance and sizes of the solenoid and the core. As a result, it is possible to obtain an advantageous effect of simplifying a structure and miniaturizing a product.

According to an embodiment of the present disclosure, the solenoid valve may include a first inclined recess formed at an end of the yoke facing the core, and a second inclined recess formed at an end of the core so as to face the first inclined recess.

As described above, since the first inclined recess and the second inclined recess are formed on the yoke and the core, the magnetic field applied to the first plunger may be linearly increased or decreased in the movement direction. As a result, it is possible to obtain an advantageous effect of more accurately controlling the movement stroke of the first plunger and further improving accuracy of proportional control for the first plunger.

According to an embodiment of the present disclosure, the solenoid valve may include a pilot valve configured to selectively reduce a pressure around the second plunger.

The pilot valve may have various structures capable of selectively reducing the pressure around the second plunger.

For example, the pilot valve may include a pilot valve groove formed in the second plunger and a pilot plunger provided in the pilot valve groove so as to be rectilinearly movable and having a pilot flow path communicating with the outlet port. Aa space may be provided around the second plunger and the pilot flow path may be closed when the pilot plunger is in close contact with an inner surface of the pilot valve groove. The space around the second plunger and the pilot flow path may communicate with each other when the pilot plunger is spaced apart from the inner surface of the pilot valve groove.

As described above, since the space around the second plunger and the pilot flow path may communicate with each other as the pilot plunger is moved downward when the pressure around the second plunger increases to a predetermined level or higher, the pressure around the second plunger may be reduced. Therefore, it is possible to obtain an advantageous effect of minimizing an excessive increase in pressure around the second plunger and preventing inoperability of the second plunger caused by an excessive increase in pressure around the second plunger.

In particular, the solenoid valve may include a pilot sealing member provided on the inner surface of the pilot valve groove and configured to selectively come into close contact with the pilot plunger. Since the pilot sealing member is provided on the inner surface of the pilot valve groove as described above, it is possible to obtain an advantageous effect of improving sealability implemented by the pilot plunger.

DETAILED DESCRIPTION

Figure 1:
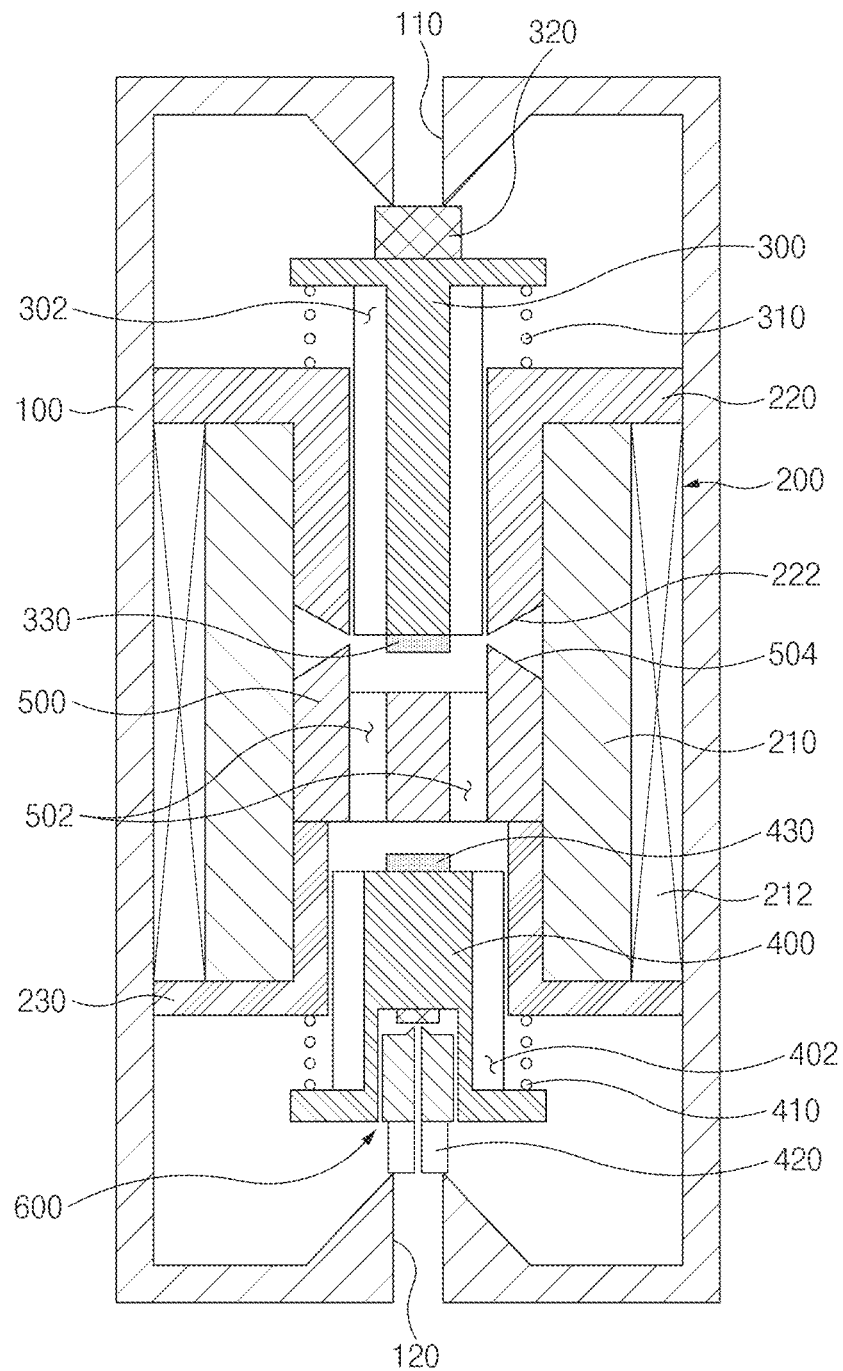
FIG. 1 is a view of a solenoid valve according to an embodiment of the present disclosure.

Hereinafter, embodiments of the present disclosure are described in detail with reference to the accompanying drawings.

However, the technical spirit of the present disclosure is not limited to the embodiments described herein but may be implemented in various different forms. One or more of the constituent elements in the embodiments may be selectively combined and substituted within the scope of the technical spirit of the present disclosure.

In addition, unless otherwise specifically and explicitly defined and stated, the terms (including technical and scientific terms) used in the embodiments of the present disclosure may be construed as having the meaning which may be commonly understood by a person having ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

Unless particularly stated otherwise in the context of the present specification, a singular form may also include a plural form. The explanation "at least one (or one or more) of A, B, and C" described herein may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element can be connected, coupled, or attached directly to another constituent element or connected, coupled, or attached to another constituent element through still another constituent element interposed therebetween.

In addition, the explanation "one constituent element is formed or disposed above (on) or below (under) another constituent element" includes not only a case in which the two constituent elements are in direct contact with each other, but also a case in which one or more additional constituent elements are formed or disposed between the two constituent elements. In addition, the expression "above (on) or below (under)" may include a meaning of a downward direction as well as an upward direction based on one constituent element. When a component, device, element, or the like of the present disclosure is described as having a purpose or performing an operation, function, or the like, the component, device, or element should be considered herein as being "configured to" meet that purpose or to perform that operation or function. Further, the controller described herein may include a processor programmed to perform the noted operation, function, operation, or the like.

Referring to FIGS. 1-11, a solenoid valve 10 according to an embodiment of the present disclosure includes a valve housing 100 having, at one end thereof, an inlet port 110 through which a fluid is introduced and having, at the other end thereof, an outlet port 120 through which the fluid is discharged. The solenoid valve 10 further includes a solenoid 200 provided in the valve housing 100 and disposed between the inlet port 110 and the outlet port 120. The solenoid valve 10 further includes a first plunger 300 provided at one end of the solenoid 200 adjacent to the inlet port 110 and configured to selectively open or close the inlet port 110 by being rectilinearly moved by the solenoid 200, and a first spring member 310 configured to provide elastic force to allow the first plunger 300 to move in a direction in which the first plunger 300 closes the inlet port 110. The solenoid valve 10 further includes a second plunger 400 provided at the other end of the solenoid 200 adjacent to the outlet port 120 and configured to selectively open or close the outlet port 120 by being rectilinearly moved by the solenoid 200 in a direction opposite to the movement direction of the first plunger 300, and a second spring member 410 configured to provide elastic force to allow the second plunger 400 to move in a direction in which the second plunger 400 closes the outlet port 120.

For reference, the solenoid valve 10 according to an embodiment of the present disclosure may be mounted in various types of systems or facilities in order to regulate a flow of a fluid or control a flow rate or a pressure. The present disclosure is not restricted or limited by the types of systems or facilities in which the solenoid valve 10 is mounted.

For example, the solenoid valve 10 according to an embodiment of the present disclosure may be installed in a power train including an engine of a vehicle and may serve to regulate a flow of a fluid such as fuel or oil or control a flow rate. More specifically, the solenoid valve 10 may be mounted in a fuel system to control an operation of supplying and injecting fuel, mounted in a cooling system to control circulation for lubrication and cooling, or mounted in a power transmission system to control a pressure.

The valve housing 100 may have various structures having therein a predetermined space and including the inlet port 110 and the outlet port 120. The present disclosure is not restricted or limited by the structure and the shape of the valve housing 100.

For example, based on FIG. 1, the inlet port 110 through which the fluid is supplied (introduced) may be provided at an upper end of the valve housing 100. The outlet port 120 through which the fluid is discharged may be provided at a lower end of the valve housing 100. The fluid, which is introduced into the valve housing 100 through the inlet port 110, may sequentially pass through the first plunger 300 and the second plunger 400 and then be discharged to the outside of the valve housing 100 through the outlet port 120.

In particular, a fluid inflow direction in which the fluid is introduced into the valve housing 100 through the inlet port 110 and a fluid outflow direction in which the fluid is discharged to the outside of the valve housing 100 through the outlet port 120 may be identical to each other. For example, based on FIG. 1, both the fluid inflow direction and the fluid outflow direction may be coaxially set in an upward/downward direction (vertical direction).

According to another embodiment of the present disclosure, the inlet port and the outlet port may be formed at other positions in the valve housing. The present disclosure is not restricted or limited by the positions and the arrangement structures of the inlet port and the outlet port. In some instances, the inlet port and the outlet port may not be disposed coaxially.

The solenoid 200 is configured to provide driving power for operating (e.g., moving upward or downward) the first plunger 300 and the second plunger 400.

In particular, the solenoid 200 is provided at a central portion of the valve housing 100 so as to be disposed between the inlet port 110 and the outlet port 120 in the valve housing 100.

The solenoid 200 may have various structures capable of providing driving power for operating the first plunger 300 and the second plunger 400. The present disclosure is not restricted or limited by the type and the structure of the solenoid 200.

For example, the solenoid 200 includes a bobbin 210 around which a coil 212 is wound, and a yoke 220 provided in the bobbin 210 at one end (an upper end based on FIG. 1) of the bobbin 210 and configured such that the first plunger 300 is partially received in the yoke 220 so as to be rectilinearly movable. The second plunger 400 is partially received in the bobbin 210 at the other end (a lower end based on FIG. 1) of the bobbin 210 so as to be rectilinearly movable.

For example, the bobbin 210 may be formed in a hollow cylindrical shape that surrounds the first plunger 300 and the second plunger 400 and is disposed at the central portion of the valve housing 100 (between the inlet port and the outlet port).

The coil 212 is wound around the bobbin 210, and power may be applied to the coil 212 from a power supply unit (not illustrated).

The yoke 220 is provided to cover a part of an inner circumferential surface of an upper end of the bobbin 210. The first plunger 300 is partially received in the yoke 220 so as to be rectilinearly movable.

The structure and the size of the yoke 220 may be variously changed in accordance with required conditions and design specifications. The present disclosure is not restricted or limited by the structure and the size of the yoke 220.

For example, the yoke 220 may be formed in a hollow cylindrical shape having a shorter length (a length in the upward/downward direction based on FIG. 1) than the bobbin 210. In particular, an upper end opening portion (not illustrated) of the yoke 220 is disposed to be directed upward (e.g., toward the inlet port), and a lower end opening portion (not illustrated) of the yoke 220 is disposed to be directed downward (e.g., toward the second plunger).

The yoke 220 may be made of typical cast iron, and the material and the property of the yoke 220 may be variously changed in accordance with required conditions and design specifications.

The first plunger 300 is provided at one end (an upper end based on FIG. 1) of the solenoid 200 adjacent to the inlet port 110 and configured to selectively open or close the inlet port 110 by being rectilinearly moved by the solenoid 200.

The first plunger 300 may have various structures capable of selectively opening or closing the inlet port 110 by being moved by the solenoid 200. The present disclosure is not restricted or limited by the shape and the structure of the first plunger 300.

For example, the first plunger 300 may be formed in the form of a rod (or a cylinder) having a predetermined diameter and a predetermined length.

The first plunger 300 is configured to selectively open or close the inlet port 110 by being selectively and rectilinearly moved in the upward/downward direction in the bobbin 210 in a state in which a part (e.g., a part of a lower portion) of the first plunger 300 is partially received in the yoke 220.

For reference, in an embodiment of the present disclosure, the configuration in which the first plunger 300 is partially received in the yoke 220 may mean that a part of the first plunger 300 is received in the yoke 220 and the remaining part of the first plunger 300 is exposed (protrudes) to the outside of the yoke 220.

The movement (stroke) of the first plunger 300 relative to the bobbin 210 may be controlled by adjusting power to be applied to the coil 212. The movement (or the stroke) of the first plunger 300 may be controlled to open or close the inlet port 110, thereby selectively shutting off (regulating) a flow of the fluid or controlling a flow rate.

For example, when the first plunger 300 moves upward, the first plunger 300 comes into contact with a lower end of the inlet port 110, such that the inlet port 110 may be closed (blocked).

On the contrary, when the first plunger 300 moves downward, the first plunger 300 moves downward from the lower end of the inlet port 110, such that the inlet port 110 may be opened. In other words, when the power is applied to the coil 212 in the state in which the first plunger 300 is partially received in the yoke 220, the first plunger 300 is moved toward the central portion of the bobbin 210 (moved downward) by a magnetic field applied to the first plunger 300, such that the inlet port 110 may be opened.

For reference, because the solenoid valve 10 according to an embodiment of the present disclosure includes the bobbin, the yoke, and the first plunger according to the well-known technology having the above-mentioned configuration and operational principle, a detailed description thereof has been omitted.

In particular, a first sealing member 320 (made of rubber or silicone, for example) is provided at an upper end of the first plunger 300 and configured to elastically come into close contact with the inlet port 110. Since the first sealing member 320 is provided at the upper end of the first plunger 300 as described above, it is possible to obtain an advantageous effect of improving sealability implemented by the first plunger 300.

More particularly, the fluid, which is introduced into the valve housing 100 through the inlet port 110, applies pressing force to the first plunger 300 so that the first plunger 300 moves in the direction in which the first plunger 300 opens the inlet port 110 (moves downward based on FIG. 1).

This is to minimize a deterioration in operating performance of the first plunger 300 caused by inflow pressure of the fluid introduced into the valve housing 100 through the inlet port 110 (i.e., non-operation of the first plunger 300 at a preset duty rate of the solenoid 200).

In other words, if the inflow pressure of the fluid introduced into the valve housing 100 is applied to a lower portion of the first plunger 300 in the upward/downward direction (based on FIG. 1), i.e., if pressing force for moving the first plunger upward is applied to the lower portion of the first plunger, there is a problem in that the first plunger 300 is difficult to normally move (move downward to open the inlet port) at a preset duty rate of the solenoid 200. There is also a problem in that the duty rate of the solenoid 200 for operating the first plunger 300 increases inevitably.

However, according to an embodiment of the present disclosure, the inflow pressure of the fluid introduced into the valve housing 100 is applied to an upper portion of the first plunger 300 in the upward/downward direction (based on FIG. 1), since the pressing force for moving the first plunger downward is applied to the upper portion of the first plunger. Thus, it is possible to obtain an advantageous effect of preventing an increase in duty rate of the solenoid 200 for operating the first plunger 300 (opening the inlet port) and an advantageous effect of sufficiently ensuring a duty-controllable section in which the movement (stroke) of the first plunger 300 may be duty-controlled (improving control performance).

Figure 2:
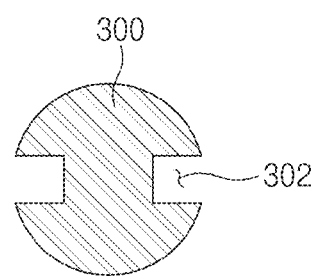
FIG. 2 is a view of a first plunger of the solenoid valve according to the embodiment of the present disclosure.

In addition, referring to FIGS. 1 and 2, a first guide flow path 302 is provided between the inlet port 110 and the second plunger 400 and configured to guide the fluid introduced into the inlet port 110 to the second plunger 400.

The first guide flow path 302 may be provided at various positions at which the first guide flow path 302 may guide the fluid introduced into the inlet port 110 to the second plunger 400. The present disclosure is not restricted or limited by the position at which the first guide flow path 302 is provided.

According to an embodiment of the present disclosure, the first guide flow path 302 configured to guide the fluid introduced into the inlet port 110 to the second plunger 400 may be provided on the first plunger 300.

The first guide flow path 302 may have various structures capable of guiding the fluid, which is introduced into the valve housing 100 through the inlet port 110, downward (to the second plunger). The present disclosure is not restricted or limited by the structure of the first guide flow path 302.

For example, the first guide flow path 302 may be formed by partially removing an outer surface (circumferential surface) of the first plunger 300. In particular, a pair of first guide flow paths 302 may be symmetrically formed on the outer surface of the first plunger 300.

For reference, in an embodiment of the present disclosure described and illustrated above, the example in which the first guide flow path is formed on the first plunger has been described. However, according to another embodiment of the present disclosure, the first guide flow path may be formed on another constituent component (e.g., at least any one of the bobbin and the yoke) positioned between the inlet port and the second plunger.

The first spring member 310 is configured to provide elastic force (SF1 in FIG. 5) to move the first plunger 300 (upward based on FIG. 1) in the direction in which the first plunger 300 closes the inlet port 110.

A typical spring (e.g., a coil spring) capable of elastically supporting the upward and downward movements of the first plunger 300 may be used as the first spring member 310. The present disclosure is not restricted or limited by the type and the structure of the first spring member 310.

For example, the first spring member 310 may surround the first plunger 300 and may be disposed between the yoke 220 and a first flange portion (not illustrated) formed at the upper end of the first plunger 300 so as to be elastically compressible and restorable.

According to another embodiment of the present disclosure, the first spring member may be provided between the valve housing and the first plunger or at any other position. In some instances, a separate support portion (not illustrated) for supporting the first spring member may be provided on an inner wall of the valve housing.

The second plunger 400 is provided at one end (a lower end based on FIG. 1) of the solenoid 200 adjacent to the outlet port 120 and configured to selectively open or close the outlet port 120 by being rectilinearly moved by the solenoid 200 in a direction opposite to the movement direction of the first plunger 300.

The second plunger 400 may have various structures capable of selectively opening or closing the outlet port 120 by being moved by the solenoid 200. The present disclosure is not restricted or limited by the shape and the structure of the second plunger 400.

For example, the second plunger 400 may be provided in the form of a rod (or a cylinder) having a predetermined diameter and a predetermined length.

In particular, the second plunger 400 may be made of typical metal (e.g., iron) capable of forming a magnetic field together with a core 500, and the present disclosure is not restricted or limited by the material of the second plunger 400.

The second plunger 400 is configured to selectively open or close the outlet port 120 while selectively rectilinearly moving in the upward/downward direction in the bobbin 210 in a state in which a part (e.g., a part of an upper portion) of the second plunger 400 is partially received in the yoke 220.

For reference, in an embodiment of the present disclosure, the configuration in which the second plunger 400 is partially received in the bobbin 210 may mean that a part of the second plunger 400 is received in the bobbin 210 and the remaining part of the second plunger 400 is exposed (protrudes) to the outside of the bobbin 210.

The movement of the second plunger 400 relative to the bobbin 210 may be controlled by adjusting (e.g., turning on/off) power to be applied to the coil 212. The movement of the second plunger 400 may be controlled to open or close the outlet port 120, thereby selectively shutting off (regulating) a flow of the fluid.

For example, when the second plunger 400 moves downward, the second plunger 400 comes into contact with an upper end of the outlet port 120, such that the outlet port 120 may be closed (blocked).

On the contrary, when the second plunger 400 moves upward, the second plunger 400 moves upward from the upper end of the outlet port 120, such that the outlet port 120 may be opened. In other words, when the power is applied to the coil 212 in the state in which the second plunger 400 is partially received in the bobbin 210, the second plunger 400 is moved toward the central portion of the bobbin 210 (moved upward) by the magnetic field applied to the second plunger 400, such that the outlet port 120 may be opened.

In particular, a second sealing member 420 (made of rubber or silicone, for example) is provided at a lower end of the second plunger 400 and configured to elastically come into contact with the outlet port 120. Since the second sealing member 420 is provided at the lower end of the second plunger 400 as described above, it is possible to obtain an advantageous effect of improving sealability implemented by the second plunger 400.

Figure 4:
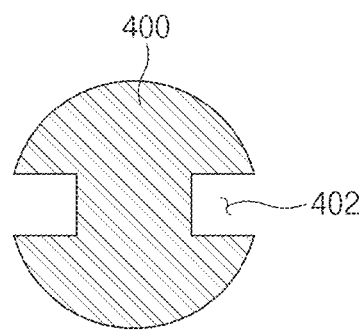
FIG. 4 is a view of a second plunger of the solenoid valve according to the embodiment of the present disclosure.
Figure 5:
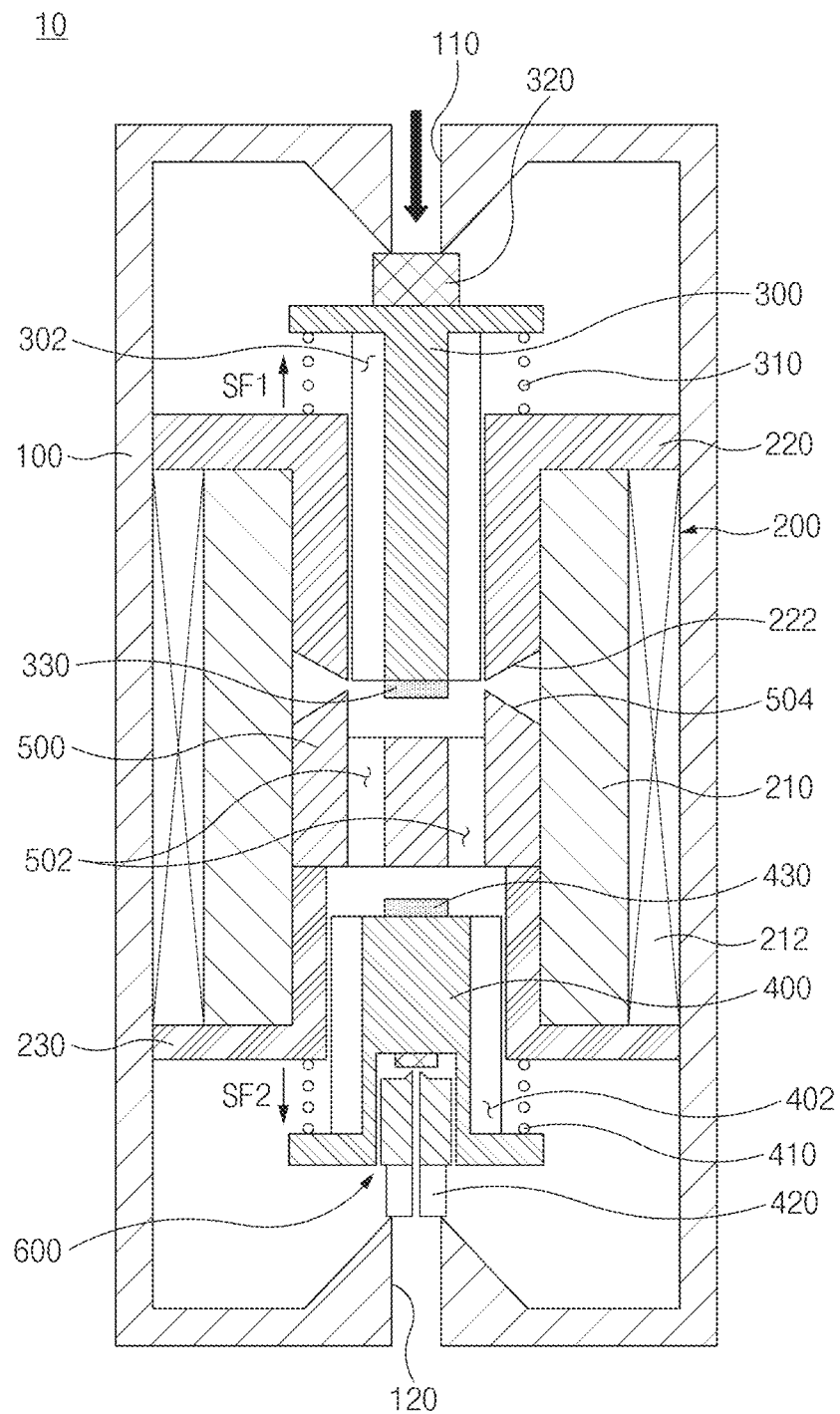
FIG. 5 is a view of the solenoid valve in a state in which an outlet port and an inlet port according to the embodiment of the present disclosure are closed.

In addition, referring to FIGS. 1 and 4, a second guide flow path 402 is provided between the first plunger 300 and the outlet port 120 and configured to guide the fluid passing through the first guide flow path 302 to the outlet port 120.

The second guide flow path 402 may be provided at various positions at which the second guide flow path 402 may guide the fluid passing through the first guide flow path 302 to the outlet port 120, and the present disclosure is not restricted or limited by the position at which the second guide flow path 402 is provided.

According to the embodiment of the present disclosure, the second guide flow path 402 is provided on the second plunger 400 and configured to guide the fluid passing through the first guide flow path 302 to the outlet port 120.

The second guide flow path 402 may have various structures capable of guiding the fluid, which passes through the first guide flow path 302, downward (to the outlet port). The present disclosure is not restricted or limited by the structure of the second guide flow path 402.

For example, the second guide flow path 402 may be formed by partially removing an outer surface (circumferential surface) of the second plunger 400. In particular, a pair of second guide flow paths 402 may be symmetrically formed on the outer surface of the second plunger 400.

For reference, in an embodiment of the present disclosure described and illustrated in above, the example in which the second guide flow path is formed on the second plunger has been described. However, according to another embodiment of the present disclosure, the second guide flow path may be formed on another constituent component (e.g., at least any one of the bobbin and a guide member) positioned between the first plunger and the outlet port.

The second spring member 410 is configured to provide elastic force (SF2 in FIG. 5) to move the second plunger 400 (downward based on FIG. 1) in the direction in which the second plunger 400 closes the outlet port 120.

A typical spring (e.g., a coil spring) capable of elastically supporting the upward and downward movements of the second plunger 400 may be used as the second spring member 410. The present disclosure is not restricted or limited by the type and the structure of the second spring member 410.

For example, the second spring member 410 may surround the second plunger 400 and may be disposed between the bobbin 210 and a second flange portion (not illustrated) formed at the lower end of the second plunger 400 so as to be elastically compressible and restorable.

According to another embodiment of the present disclosure, the second spring member may be provided between the valve housing and the second plunger or at other positions. In some instances, a separate support portion (not illustrated) for supporting the second spring member may be provided on the inner wall of the valve housing.

According to the embodiment of the present disclosure, a guide member 230 may be provided at the other end of the bobbin 210 and in the bobbin 210 and configured to guide the upward and downward movements of the second plunger 400.

For example, the guide member 230 may be formed in a hollow cylindrical shape that surrounds the second plunger 400. The guide member 230 may be provided between an inner circumferential surface of the bobbin 210 and an outer circumferential surface of the second plunger 400 and configured to guide the rectilinear movement of the second plunger 400. In particular, a lower end of the guide member 230 may extend to surround a bottom surface of the bobbin 210.

Since the guide member 230 is provided in the bobbin 210 as described above, it is possible to obtain an advantageous effect of minimizing leftward and rightward movements and deviation of the second plunger 400 when the second plunger 400 rectilinearly moves. It is also possible to obtain an advantageous effect of improving driving stability of the second plunger 400.

According to the embodiment of the present disclosure, the solenoid valve 10 may include the core 500 provided in the solenoid 200 and disposed between the first plunger 300 and the second plunger 400.

The core 500 is provided to ensure smoother movements of the first and second plungers 300 and 400 relative to the solenoid 200.

In other words, since the core 500 is provided between the first plunger 300 and the second plunger 400, an additional magnetic field for moving the first and second plungers 300 and 400 toward the central portion of the bobbin 210 may be formed by the core 500 when the power is applied to the coil 212. As a result, it is possible to obtain an advantageous effect of ensuring smoother operations of the first and second plungers 300 and 400 and increasing the magnetic field for moving the first and second plungers 300 and 400 without increasing a size of the solenoid 200.

The core 500 may be made of typical metal (e.g., iron) capable of forming a magnetic field. The present disclosure is not restricted or limited by the material of the core 500.

Figure 3:
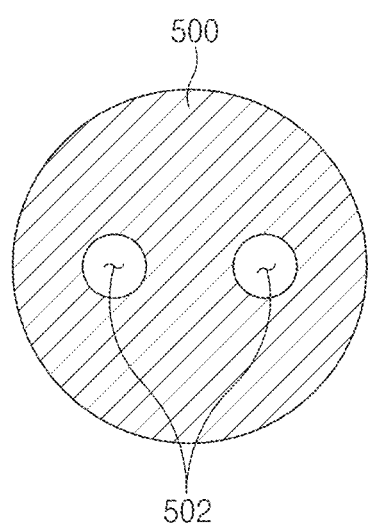
FIG. 3 is a view of a core of the solenoid valve according to the embodiment of the present disclosure.

In particular, referring to FIGS. 1 and 3, a through flow path 502 is formed in the core 500 and configured to guide the fluid passing through the first guide flow path 302 to the second guide flow path 402.

The through flow path 502 may have various structures capable of guiding the fluid passing through the first guide flow path 302 to the second guide flow path 402. The present disclosure is not restricted or limited by the structure of the through flow path 502 and the number of through flow paths 502. For example, two through flow paths 502 may be formed in the core 500 and penetrate the core 500 in the upward/downward direction. According to another embodiment of the present disclosure, the through flow path may be formed on a circumferential surface of the core. In another embodiment, the through flow path may be formed in an inclined shape or a curved shape.

According to an embodiment of the present disclosure, the solenoid valve 10 may include a first buffer member 330 provided at an end (e.g., a lower end) of the first plunger 300 facing the core 500, and a second buffer member 430 provided at an end (e.g., an upper end) of the second plunger 400 facing the core 500.

Since the first buffer member 330 is provided between the first plunger 300 and the core 500 and the second buffer member 430 is provided between the second plunger 400 and the core 500 as described above, it is possible to mitigate impact which occurs when the first and second plungers 300 and 400 come into contact with the core 500. As a result, it is possible to obtain an advantageous effect of improving stability and reliability and reducing operational noise.

The first buffer member 330 may be made of a buffer material (e.g., an elastic material) capable of mitigating impact force that occurs when the end of the first plunger 300 comes into contact with the core 500. The present disclosure is not restricted or limited by the structure and the material of the first buffer member 330.

Likewise, the second buffer member may be made of a buffer material (e.g., an elastic material) capable of mitigating impact force that occurs when the end of the second plunger 400 comes into contact with the core 500. The present disclosure is not restricted or limited by the structure and the material of the second buffer member.

In the embodiment of the present disclosure described and illustrated above, the example in which the first buffer member 330 is provided at the end of the first plunger 300 and the second buffer member 430 is provided at the end of the second plunger 400 has been described. However, according to another embodiment of the present disclosure, the buffer members may be provided on an upper surface and a bottom surface of the core.

Meanwhile, the timings of moving the first plunger 300 and the second plunger 400 by the solenoid 200 may be variously changed in accordance with required conditions and design specifications.

According to an embodiment of the present disclosure, the first plunger 300 and the second plunger 400 sequentially open or close the outlet port 120 and the inlet port 110 based on a pulse width modulation (PWM) duty rate of the solenoid 200.

For example, when the second plunger 400 moves upward first based on the duty rate of the solenoid 200, the outlet port 120 may be opened before the inlet port 110 is opened. Thereafter, when the first plunger 300 moves downward based on the duty rate of the solenoid 200, the inlet port 110 may be subsequently opened (at a predetermined time interval from a point in time at which the outlet port is opened).

In contrast, when the first plunger 300 moves upward based on the duty rate of the solenoid 200 in a state in which both the outlet port 120 and the inlet port 110 are opened, the inlet port 110 may be closed (before the outlet port 120 is closed). Therefore, when the second plunger 400 moves downward based on the duty rate of the solenoid 200, the outlet port 120 may be subsequently closed (at a predetermined time interval from a point in time at which the inlet port is closed).

The timings of moving the first plunger 300 and the second plunger 400 may be variously changed based on the duty rate of the solenoid 200. The present disclosure is not restricted or limited by the timings of moving the first plunger 300 and the second plunger 400 based on the duty rate of the solenoid 200.

Further, the timings of moving the first plunger 300 and the second plunger 400 based on the duty rate of the solenoid 200 may be adjusted by differently tuning parameters (e.g., the shapes and the materials of the first and second plungers and the shape and the material of the guide member) related to the formation of the magnetic field for the first and second plungers 300 and 400 or differently tuning parameters (e.g., spring constants) related to the first and second spring members 310 and 410.

For example, when the duty rate of the solenoid 200 is within a first range, the second plunger 400 may close the outlet port 120, and the first plunger 300 may close the inlet port 110. In contrast, when the duty rate of the solenoid 200 is within a second range larger than the first range, the second plunger 400 may open the outlet port 120, and the first plunger 300 may close the inlet port 110. In addition, when the duty rate of the solenoid 200 is within a third range larger than the second range, the first plunger 300 may open the inlet port 110 in a state in which the first plunger 300 opens the outlet port 120.

Figure 9:
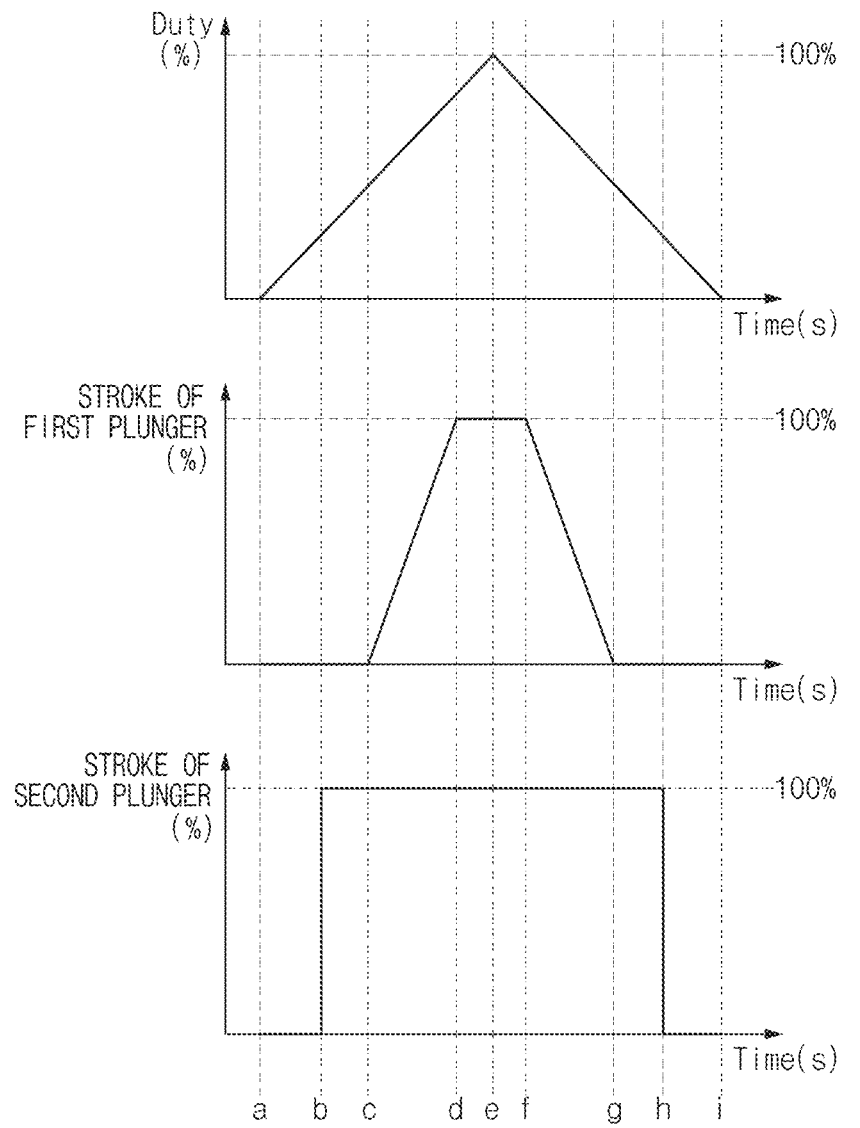
FIG. 9 is a plot of movement strokes of the first plunger and the second plunger in accordance with a duty rate of a solenoid in the solenoid valve according to the embodiment of the present disclosure.
Figure 10:
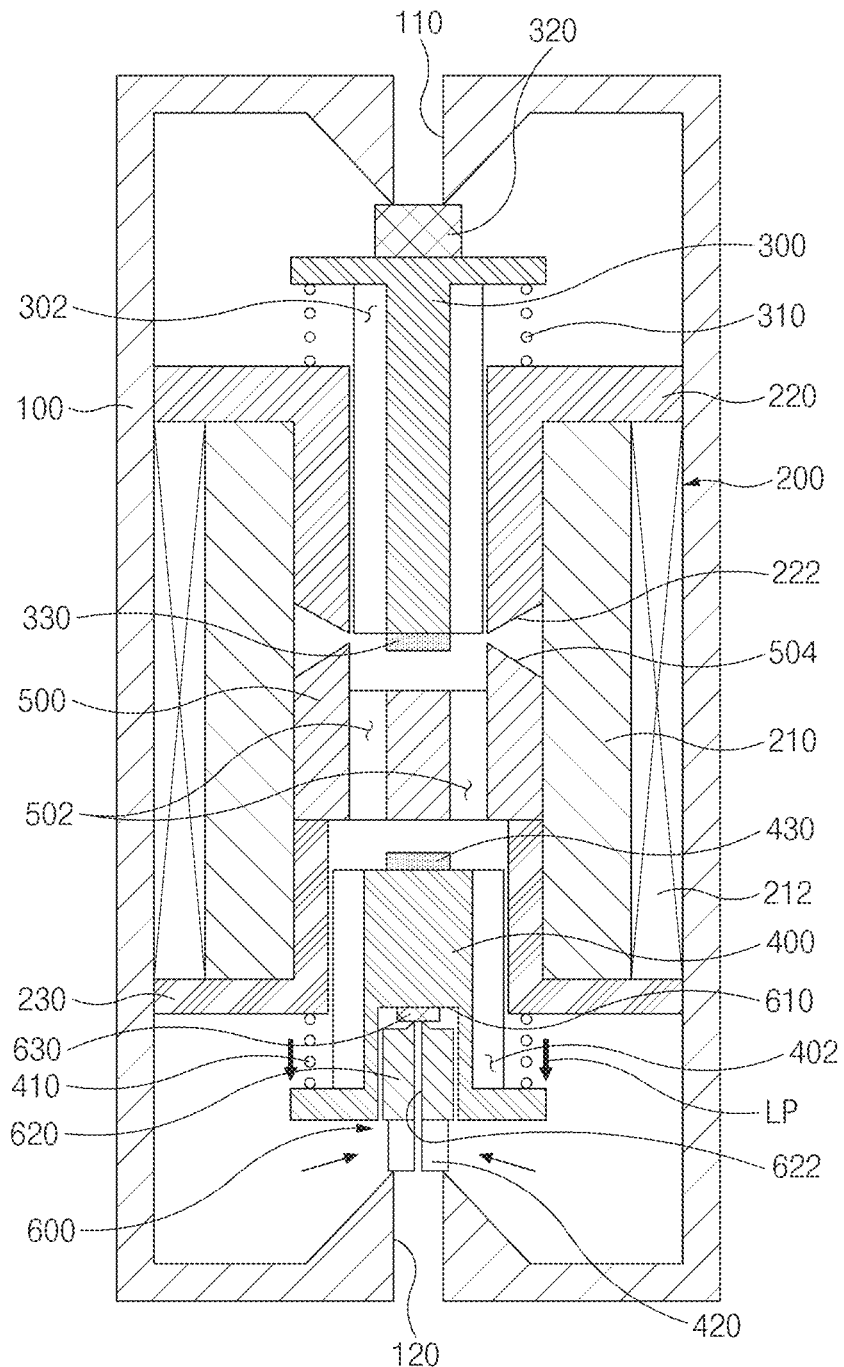
FIGS. 10 and 11 are views of a pilot valve of the solenoid valve according to the embodiment of the present disclosure.
Figure 11:
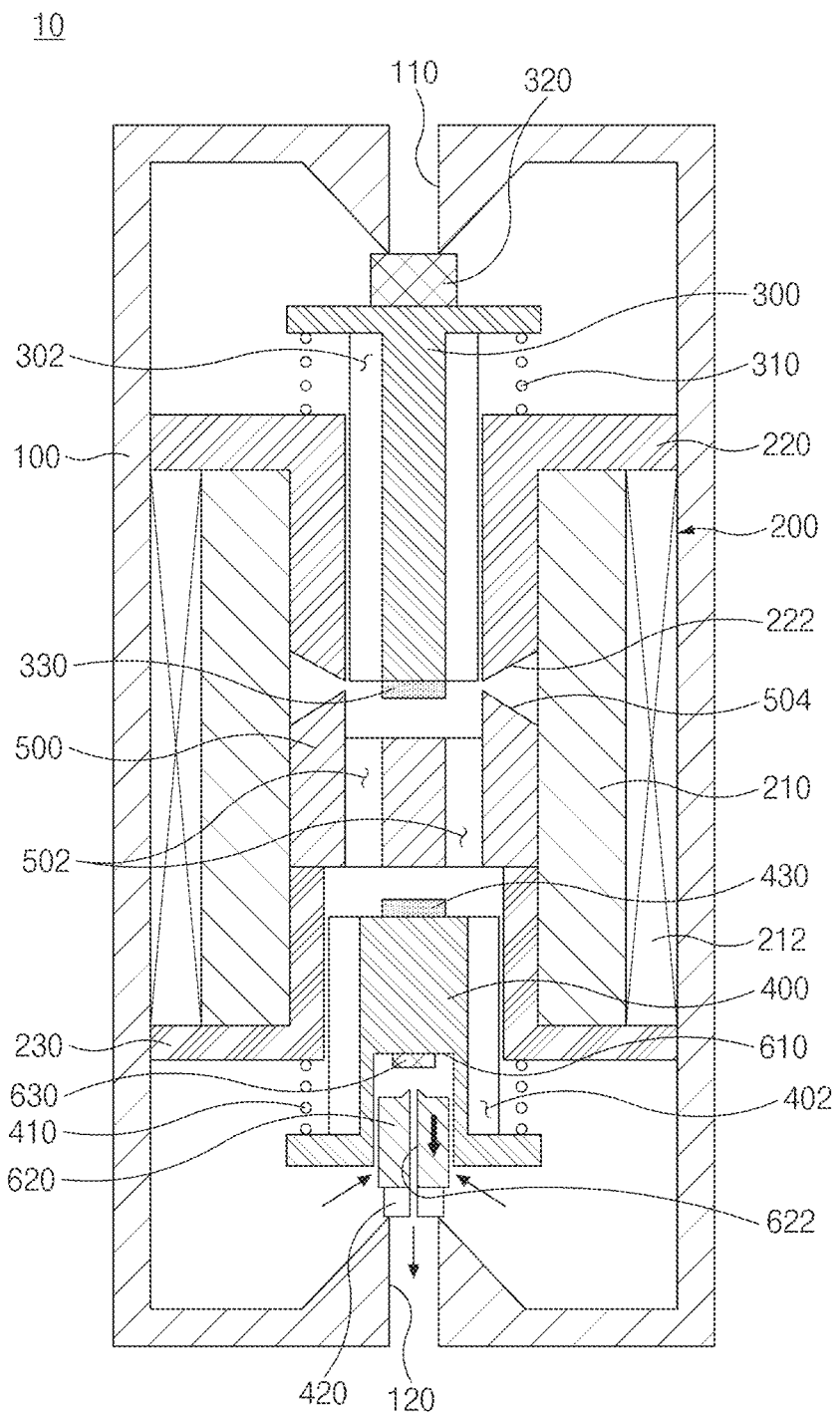

For example, referring to FIG. 9, when a target duty rate of the solenoid 200 is 100%, the duty rate of the solenoid 200 may be increased linearly (periodically) from 0% to 100%. For example, the first range may be included in a range of 0 to 19%, the second range may be included in a range of 20 to 39%, and the third range may be included in a range of 40 to 100%.

For reference, in FIG. 9, a point 'a' is a point at which the duty rate of the solenoid 200 is 0%. A point 'b' is a point at which the second plunger 400 begins to open the outlet port 120. A point 'c' is a point at which the first plunger 300 begins to open the inlet port 110. A section between points 'c' and 'd' is a section in which the duty rate related to the opening operation of the first plunger 300 (the operation of opening the inlet port) is controlled. A point 'd' is a point at which the first plunger 300 begins to maximally open the inlet port 110. A point 'e' is a point at which the duty rate of the solenoid 200 is 100%. Aa point 'f' is a point at which the first plunger 300 begins to close the inlet port 110. A section between points 'f' and 'g' is a section in which the duty rate related to the closing operation of the first plunger 300 (the operation of closing the inlet port) is controlled. A point 'g' is a point at which the first plunger 300 begins to fully (maximally) close the inlet port 110. A point 'h' is a point at which the second plunger 400 begins to close the outlet port 120. A point 'i' is a point at which the duty rate of the solenoid 200 is 0%.

More specifically, when the duty rate of the solenoid 200 is within the first range (see the section between 'a' and 'b' in FIG. 9), the second plunger 400 may close the outlet port 120, and the first plunger 300 may close the inlet port 110. In this case, the closed state of the outlet port 120 may be maintained by the elastic force SF2 of the second spring member 410, and the closed state of the inlet port 110 may be maintained by the elastic force SF1 of the first spring member 310 (see FIG. 5).

Figure 6:
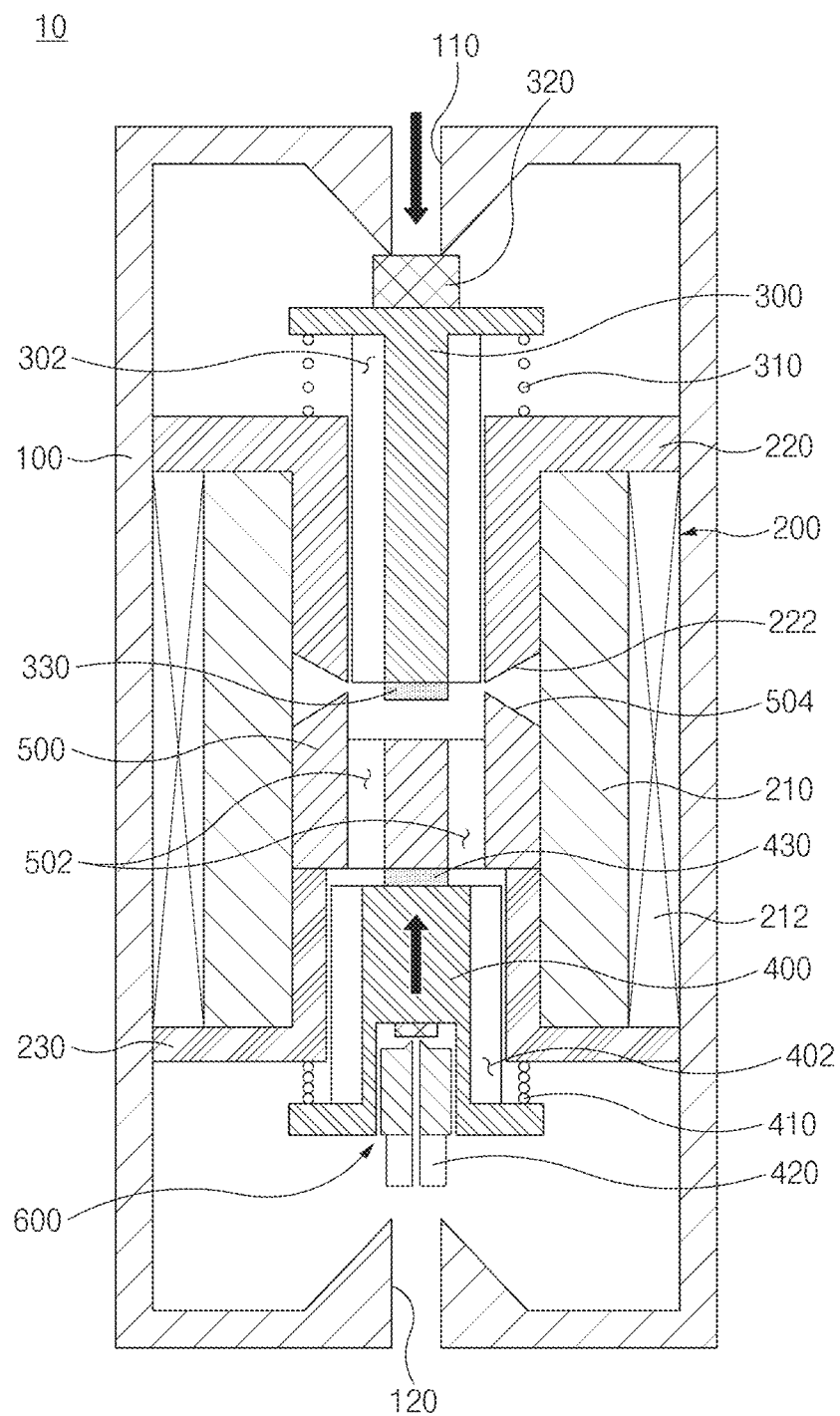
FIGS. 6-8 are views of a structure for operating the first plunger and the second plunger of the solenoid valve according to the embodiment of the present disclosure.

Next, when the duty rate of the solenoid 200 is within the second range (see the section between 'b' and 'c' in FIG. 9), the state in which the first plunger 300 closes the inlet port 110 is maintained, and the second plunger 400 opens the outlet port 120 (see FIG. 6).

Figure 7:
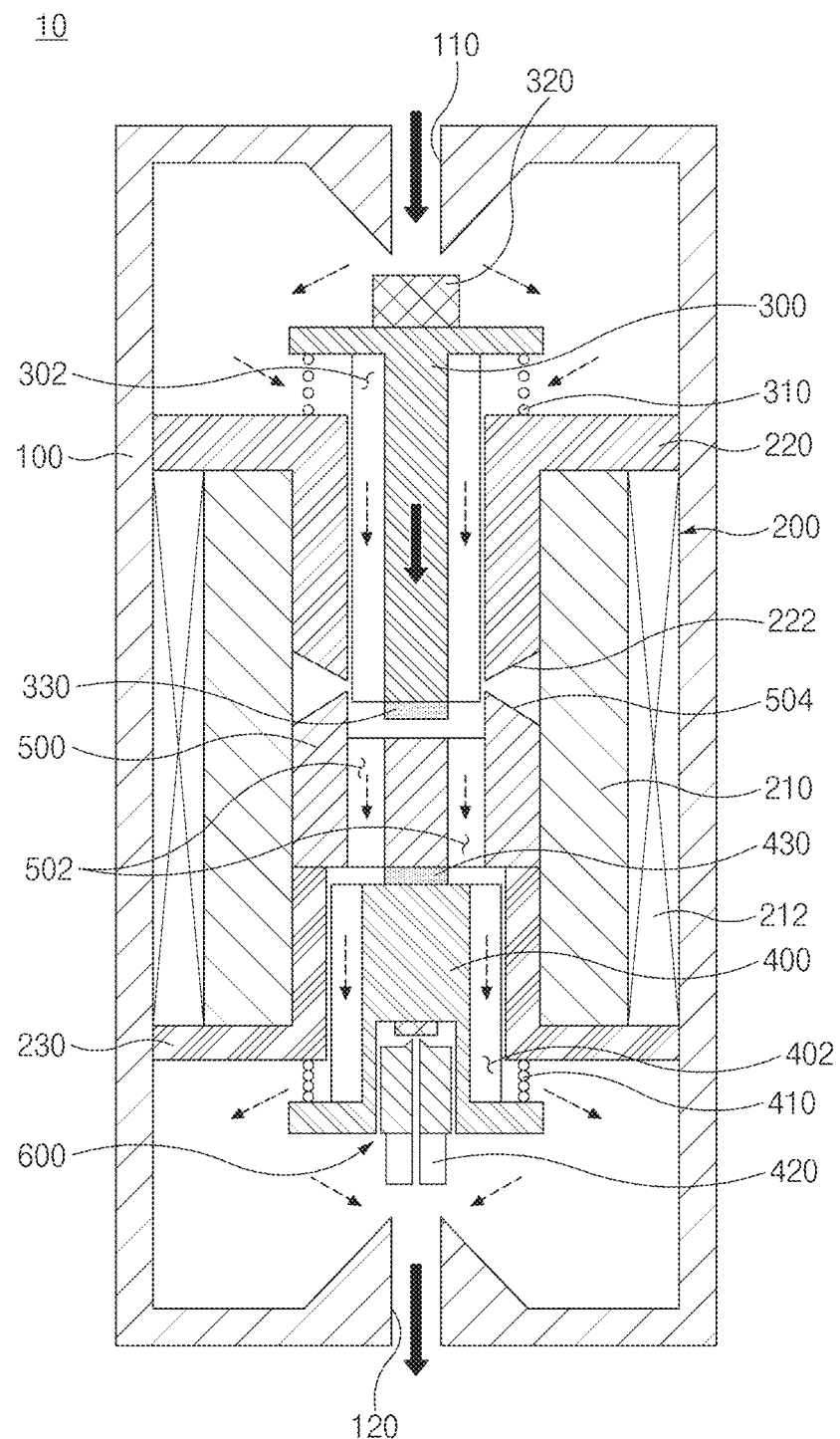
Figure 8:
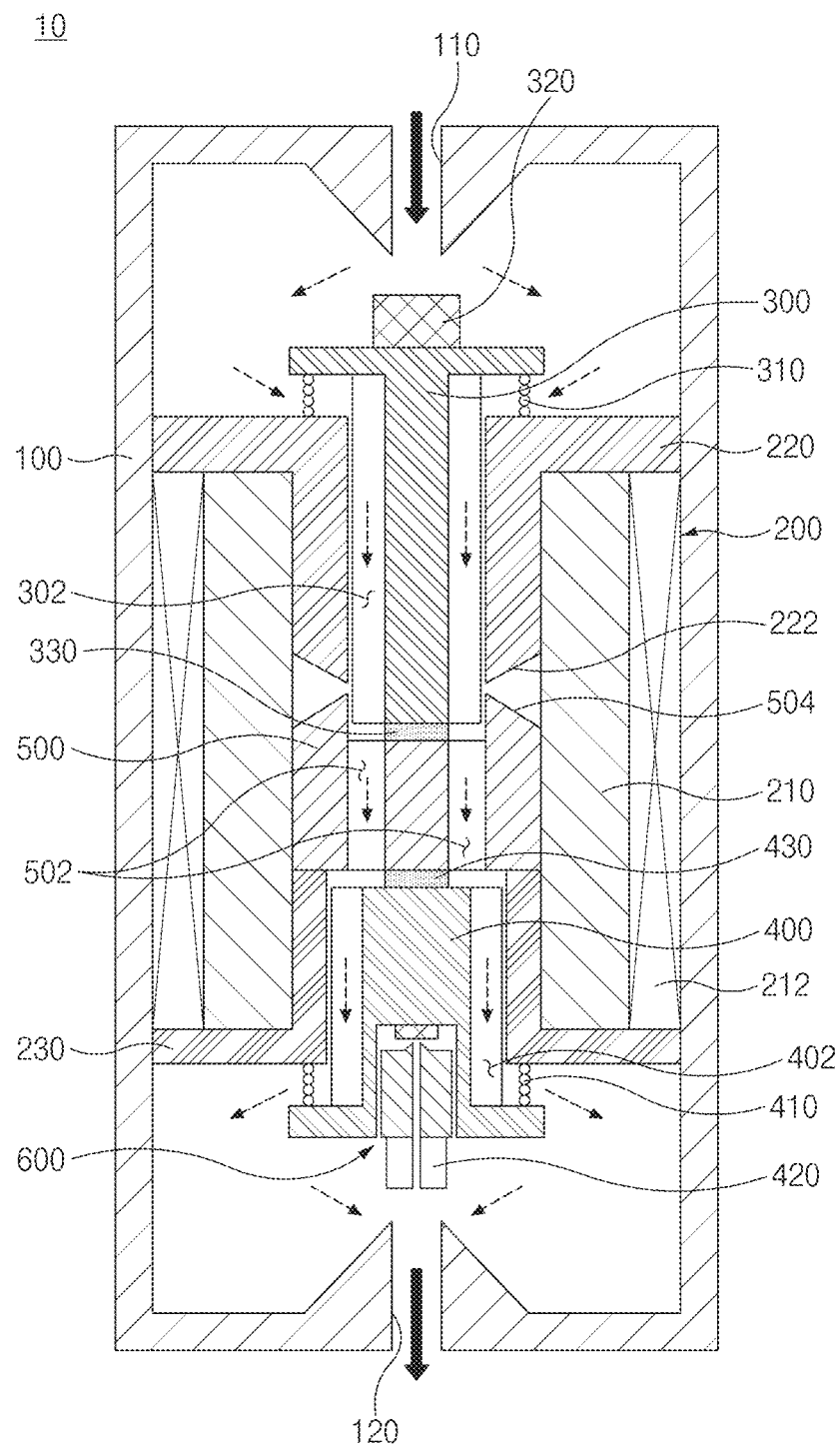

Next, when the duty rate of the solenoid 200 is within the third range (see the section between 'c' and 'd' in FIG. 9), the first plunger 300 opens the inlet port 110 in the state in which the second plunger 400 opens the outlet port 120 (see FIG. 7).

In particular, in the state in which the second plunger 400 opens the outlet port 120, the second plunger 400 may be disposed to be in close contact with the lower portion of the core 500. The first plunger 300 may open the inlet port 110 by being rectilinearly moved by the magnetic field applied by the core 500 and the second plunger 400.

As described above, in an embodiment of the present disclosure, since the magnetic fields (the magnetic fields for moving the first plunger) are generated by the core 500 and the second plunger 400 in the state in which the second plunger 400 is in close contact with the lower portion of the core 500 and the outlet port 120 is opened, the first plunger 300 may be moved by using both the magnetic field generated by the core 500 and the magnetic field generated by the second plunger 400. As a result, it is possible to obtain an advantageous effect of improving efficiency in moving (operating) the first plunger 300.

Among other things, according to an embodiment of the present disclosure, the high magnetic fields (the magnetic field generated by the core and the magnetic field generated by the second plunger) for smoothly moving the first plunger 300 may be formed without increasing inductance and sizes of the solenoid 200 and the core 500. As a result, it is possible to obtain an advantageous effect of simplifying a structure and miniaturizing a product.

In other words, in the state in which the second plunger 400 is in close contact with the lower portion of the core 500 and the outlet port 120 is opened, it is possible to obtain performance similar to performance obtained when the first plunger 300 is operated by using another solenoid (not illustrated) having a larger capacity and another core (not illustrated) having a larger capacity.

In addition, in the state in which the duty rate of the solenoid 200 is within the third range, the movement stroke of the first plunger 300 may be changed (i.e., the first plunger may be moved in the upward/downward direction) based on the duty rate of the solenoid 200. Therefore, the flow rate of the fluid to be introduced into the inlet port 110 may be adjusted as the movement stroke of the first plunger 300 is changed (see FIG. 8).

In contrast, when the duty rate of the solenoid 200 becomes within the third range again (see the section between 'f' and 'g' in FIG. 9) in the state in which both the outlet port 120 and the inlet port 110 are fully opened (see the section between 'd' and 'f' in FIG. 9), the first plunger 300 closes the inlet port 110 in the state in which the second plunger 400 opens the outlet port 120.

Next, when the duty rate of the solenoid 200 becomes within the second range again (see the section between 'g' and 'h' in FIG. 9), the second plunger 400 closes the outlet port 120 in the state in which the first plunger 300 closes the inlet port 110.

Next, when the duty rate of the solenoid 200 becomes within the first range again (see the section between 'h' and 'i' in FIG. 9), the closed state of the outlet port 120 may be maintained by the elastic force SF2 of the second spring member 410, and the closed state of the inlet port 110 may be maintained by the elastic force SF1 of the first spring member 310.

As described above, according to an embodiment of the present disclosure, the first plunger 300 and the second plunger 400 independently operate to close the inlet port 110 and the outlet port 120, such that a double shut-off structure may be implemented. As a result, it is possible to obtain an advantageous effect of ensuring high sealability and improving stability and reliability.

Furthermore, according to an embodiment of the present disclosure, the first plunger 300 and the second plunger 400 may be independently operated only by the single solenoid 200 without providing a plurality of solenoids 200. As a result, it is possible to obtain an advantageous effect of simplifying the structure, improving spatial utilization and a degree of design freedom, and reducing costs.

Moreover, according to an embodiment of the present disclosure, the first plunger 300 and the second plunger 400 may be sequentially operated based on the duty rate of the solenoid 200, such that the movements of the first plunger 300 and the second plunger 400 may be controlled by a single controller. As a result, it is possible to more simplify the structure of the controller and the structure for connecting the controller.

In addition, according to an embodiment of the present disclosure, the first plunger 300 and the second plunger 400 may be independently operated. As a result, it is possible to obtain an advantageous effect of maintaining sealability even though any one of the first plunger 300 and the second plunger 400 is abnormal (broken down).

According to an embodiment of the present disclosure, the solenoid valve 10 may include a first inclined recess 222 formed at an end of the yoke 220 facing the core 500, and a second inclined recess 504 formed at an end of the core 500 to face the first inclined recess 222.

For example, the first inclined recess 222 may be formed at a lower end of the yoke 220, and the second inclined recess 504 may be formed at an upper end of the core 500.

In particular, the first inclined recess 222 and the second inclined recess 504 may be inclined in opposite directions, and the first inclined recess 222 and the second inclined recess 504 may have gradients corresponding to each other.

For example, based on FIG. 1, the first inclined recess 222 may be formed at the lower end of the yoke 220 so as to be inclined upward, and the second inclined recess 504, which has the gradient corresponding to the gradient of the first inclined recess 222, may be formed at the upper end of the core 500 so as to be inclined downward.

According to another embodiment of the present disclosure, the first inclined recess and the second inclined recess may be inclined in the same direction (inclined upward or downward).

Since the first inclined recess 222 and the second inclined recess 504 are formed on the yoke 220 and the core 500, respectively, as described above, it is possible to obtain an advantageous effect of further improving accuracy of proportional control for the first plunger 300.

In other words, since the first inclined recess 222 is formed at the lower end of the yoke 220 and the second inclined recess 504 is formed at the upper end of the core 500, the magnetic field to be applied to the first plunger 300 may be linearly increased or decreased in the upward/downward direction. As a result, it is possible to obtain an advantageous effect of more accurately controlling the movement stroke of the first plunger 300 and further improving accuracy of proportional control for the first plunger 300.

According to the embodiment of the present disclosure, the solenoid valve 10 may include a pilot valve 600 configured to selectively reduce a pressure around the second plunger 400.

The pilot valve 600 is provided to minimize an excessive increase in pressure LP around the second plunger 400 (pressing force for moving the second plunger downward) when the fluid leaks between the inlet port 110 and the first plunger 300 due to a deterioration in sealing performance of the first plunger 300. The pilot valve 600 also serves to prevent inoperability of the second plunger 400 caused by an excessive increase in pressure around the second plunger 400.

The pilot valve 600 may have various structures capable of selectively reducing the pressure around the second plunger 400. The present disclosure is not restricted or limited by the type and the structure of the pilot valve 600.

For example, the pilot valve 600 may include a pilot valve groove 610 formed in the second plunger 400, and a pilot plunger 620 provided in the pilot valve groove 610 so as to be rectilinearly movable and having a pilot flow path 622 communicating with the outlet port 120. When the pilot plunger 620 is in close contact with an inner surface of the pilot valve groove 610 (the pilot plunger 620 is moved upward based on FIG. 10), a space around the second plunger 400 and the pilot flow path 622 are closed. When the pilot plunger 620 is separated from the inner surface of the pilot valve groove 610 (the pilot plunger 620 is moved downward based on FIG. 10), the space around the second plunger 400 and the pilot flow path 622 may communicate with each other.

For reference, in the case in which the second sealing member 420 is provided on the lower portion of the second plunger 400, the second sealing member 420 may have a communication flow path (not illustrated) that allows the pilot flow path 622 and the outlet port 120 to communicate with each other.

When the pressure around the second plunger 400 increases to a predetermined level or higher, the fluid is introduced into an upper space of the pilot plunger 620 (a space between the upper surface of the pilot plunger and the inner surface of the pilot valve groove) through a gap between the pilot valve groove 610 and the pilot plunger 620, such that the pilot plunger 620 may be moved downward.

As described above, since the space around the second plunger 400 and the pilot flow path 622 may communicate with each other as the pilot plunger 620 is moved downward when the pressure around the second plunger 400 increases to a predetermined level or higher, the pressure around the second plunger 400 may be reduced.

In particular, the solenoid valve 10 may include a pilot sealing member 630 (made of rubber or silicone, for example) provided on the inner surface of the pilot valve groove 610 so that the pilot plunger 620 may selectively come into close contact with the pilot sealing member 630. Since the pilot sealing member 630 is provided on the inner surface of the pilot valve groove 610 as described above, it is possible to obtain an advantageous effect of improving sealability implemented by the pilot plunger 620.

As described above, according to an embodiment of the present disclosure, it is possible to obtain an advantageous effect of ensuring sealability and simplifying the structure.

In particular, according to an embodiment of the present disclosure, it is possible to obtain an advantageous effect of implementing the double shut-off (sealing) structure by using the single solenoid.

In addition, according to an embodiment of the present disclosure, it is possible to obtain an advantageous effect of improving spatial utilization and a degree of design freedom and reducing costs.

In addition, according to an embodiment of the present disclosure, it is possible to obtain an advantageous effect of improving stability and reliability.

In addition, according to an embodiment of the present disclosure, it is possible to obtain an advantageous effect of improving accuracy of proportional control.

While specific embodiments have been described above, the embodiments are intended only to be illustrative and not intended to limit the present disclosure. It should be appreciated by those having ordinary skill in the art that various modifications and alterations, which are not described above, may be made to the present embodiment without departing from the intrinsic features of the present embodiment. For example, the respective constituent elements specifically described in the embodiments may be modified and then carried out. Further, it should be interpreted that the differences related to the modifications and alterations are included in the scope of the present disclosure defined by the appended claims.

What is claimed is:

1. A solenoid valve comprising:
   a valve housing having, at one end thereof, an inlet port through which a fluid is introduced and having, at the other end thereof, an outlet port through which the fluid is discharged;
   a solenoid provided in the valve housing and disposed between the inlet port and the outlet port;
   a first plunger provided at one end of the solenoid adjacent to the inlet port and configured to selectively open or close the inlet port by being rectilinearly moved by the solenoid;
   a first spring member configured to provide elastic force to allow the first plunger to move in a direction in which the first plunger closes the inlet port;
   a second plunger provided at the other end of the solenoid adjacent to the outlet port and configured to selectively open or close the outlet port by being rectilinearly moved by the solenoid in a direction opposite to the movement direction of the first plunger; and a second spring member configured to provide elastic force to allow the second plunger to move in a direction in which the second plunger closes the outlet port, wherein the second plunger and the first plunger sequentially open or close the outlet port and the inlet port based on a duty rate of the solenoid, wherein, when the duty rate of the solenoid is within a first range, the second plunger closes the outlet port and the first plunger closes the inlet port, wherein, when the duty rate of the solenoid is within a second range larger than the first range, the second plunger opens the outlet port and the first plunger closes the inlet port, and wherein, when the duty rate of the solenoid is within a third range larger than the second range, the first plunger opens the inlet port in a state in which the second plunger opens the outlet port.

2. A solenoid valve comprising:

a valve housing having, at one end thereof, an inlet port through which a fluid is introduced and having, at the other end thereof, an outlet port through which the fluid is discharged;

a solenoid provided in the valve housing and disposed between the inlet port and the outlet port;

a first plunger provided at one end of the solenoid adjacent to the inlet port and configured to selectively open or close the inlet port by being rectilinearly moved by the solenoid;

a first spring member configured to provide elastic force to allow the first plunger to move in a direction in which the first plunger closes the inlet port;

a second plunger provided at the other end of the solenoid adjacent to the outlet port and configured to selectively open or close the outlet port by being rectilinearly moved by the solenoid in a direction opposite to the movement direction of the first plunger; and a second spring member configured to provide elastic force to allow the second plunger to move in a direction in which the second plunger closes the outlet port, wherein the solenoid includes
a bobbin around which a coil is wound, and
a yoke provided in the bobbin at one end of the bobbin so that the first plunger is partially received in the yoke so as to be rectilinearly movable, and wherein the second plunger is partially received in the bobbin at the other end of the bobbin so as to be rectilinearly movable.

3. The solenoid valve of claim 2, wherein a first guide flow path is provided between the inlet port and the second plunger and configured to guide the fluid introduced into the inlet port to the second plunger, and wherein a second guide flow path is provided between the first plunger and the outlet port and configured to guide the fluid passing through the first guide flow path to the outlet port.

4. The solenoid valve of claim 3, wherein the first guide flow path is formed on the first plunger and the second guide flow path is formed on the second plunger.

5. The solenoid valve of claim 4, comprising:

a core provided in the solenoid and disposed between the first plunger and the second plunger, wherein the core has a through flow path configured to guide the fluid passing through the first guide flow path to the second guide flow path.

6. The solenoid valve of claim 5, comprising:

a first inclined recess formed at an end of the yoke facing the core; and a second inclined recess formed at an end of the core so as to face the first inclined recess.

7. The solenoid valve of claim 6, wherein the first inclined recess and the second inclined recess are inclined in opposite directions, and wherein the first inclined recess and the second inclined recess have gradients corresponding to each other.

8. The solenoid valve of claim 5, comprising:

a first buffer member provided at an end of the first plunger facing the core; and a second buffer member provided at an end of the second plunger facing the core.

9. The solenoid valve of claim 2, comprising:

a guide member provided in the bobbin at the other end of the bobbin and configured to guide the rectilinear movement of the second plunger.

10. The solenoid valve of claim 2, wherein, when the second plunger approaches the core to open the outlet port, the first plunger is rectilinearly moved in the yoke by a magnetic field applied by the core and the second plunger.

11. The solenoid valve of claim 1, comprising:

a first sealing member provided on the first plunger and configured to come into close contact with the inlet port.

12. The solenoid valve of claim 1, comprising:

a second sealing member provided on the second plunger and configured to come into close contact with the outlet port.

13. The solenoid valve of claim 1, wherein the fluid, which is introduced into the valve housing through the inlet port, applies a pressing force to the first plunger so that the first plunger moves in a direction in which the first plunger opens the inlet port.

14. The solenoid valve of claim 1, wherein a fluid inflow direction in which the fluid is introduced through the inlet port is identical to a fluid outflow direction in which the fluid is discharged to the outside of the valve housing through the outlet port.

15. A solenoid valve comprising:

a valve housing having, at one end thereof, an inlet port through which a fluid is introduced and having, at the other end thereof, an outlet port through which the fluid is discharged;

a solenoid provided in the valve housing and disposed between the inlet port and the outlet port;

a first plunger provided at one end of the solenoid adjacent to the inlet port and configured to selectively open or close the inlet port by being rectilinearly moved by the solenoid;

a first spring member configured to provide elastic force to allow the first plunger to move in a direction in which the first plunger closes the inlet port;

a second plunger provided at the other end of the solenoid adjacent to the outlet port and configured to selectively open or close the outlet port by being rectilinearly moved by the solenoid in a direction opposite to the movement direction of the first plunger;

a second spring member configured to provide elastic force to allow the second plunger to move in a direction in which the second plunger closes the outlet port; and a pilot valve configured to selectively reduce a pressure around the second plunger, wherein the pilot valve includes
- a pilot valve groove formed in the second plunger, and
- a pilot plunger provided in the pilot valve groove so as to be rectilinearly movable and having a pilot flow path communicating with the outlet port, wherein a space around the second plunger and the pilot flow path are closed when the pilot plunger is in close contact with an inner surface of the pilot valve groove, and wherein the space around the second plunger and the pilot flow path communicate with each other when the pilot plunger is spaced apart from the inner surface of the pilot valve groove.

16. The solenoid valve of claim 15, comprising:
a pilot sealing member provided on the inner surface of the pilot valve groove and configured to selectively come into close contact with the pilot plunger.

\* \* \* \* \*